(12) United States Patent
Neelakantan et al.

(10) Patent No.: US 8,037,989 B2
(45) Date of Patent: Oct. 18, 2011

(54) TORQUE TRANSMITTING DEVICE ACTUATION SYSTEM USING A PIEZOELECTRIC PUMP

(75) Inventors: Vijay A. Neelakantan, Rochester Hills, MI (US); John C. Schultz, Saline, MI (US); Bret M. Olson, Canton, MI (US); Hamid Vahabzadeh, Oakland, MI (US); Robert L. Moses, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 482 days.

(21) Appl. No.: 12/180,237

(22) Filed: Jul. 25, 2008

(65) Prior Publication Data

US 2010/0018829 A1    Jan. 28, 2010

(51) Int. Cl.
 *F16D 25/12* (2006.01)
(52) U.S. Cl. .................... 192/85.63; 192/85.24
(58) Field of Classification Search .............. None
See application file for complete search history.

(56) References Cited

U.S. PATENT DOCUMENTS

| | | | |
|---|---|---|---|
| 4,738,493 A * | 4/1988 | Inagaki et al. | 303/116.1 |
| 6,889,811 B2 * | 5/2005 | Ebert et al. | 192/48.618 |
| 2005/0092576 A1 * | 5/2005 | Hessell et al. | 192/109 F |
| 2005/0244288 A1 * | 11/2005 | O'Neill | 417/413.2 |
| 2008/0011577 A1 * | 1/2008 | Burkhart et al. | 192/85 R |

OTHER PUBLICATIONS

Gi-Woo Kim and K. W. Wang; Piezoelectric-Hydraulic Pump Based Band Brake Actuation System for Automotive Transmission Control; Active and Passive Smart Structures and Integrated Systems 2007, edited by Yuji Matsuzaki, Mehdi Ahmadian, Donald Leo; Proc. of SPIE vol. 6525, 65251E, USA, (2007).

* cited by examiner

*Primary Examiner* — David D Le
*Assistant Examiner* — Jacob S Scott

(57) ABSTRACT

A hydraulic control system for actuating a torque transmitting device in a transmission includes a sump for receiving a hydraulic fluid and a piezoelectric pump for pumping the hydraulic fluid from the sump to the torque transmitting device. A first fluid flow path communicates the hydraulic fluid from the sump to the piezoelectric pump and a second fluid flow path communicates the hydraulic fluid from the piezoelectric pump to the torque transmitting device. An exhaust means selectively communicates the hydraulic fluid from the torque transmitting device to the sump.

7 Claims, 3 Drawing Sheets

TORQUE TRANSMITTING DEVICE ACTUATION SYSTEM USING A PIEZOELECTRIC PUMP

FIELD

The present disclosure relates to a torque transmitting device actuation system in an automobile transmission, and more particularly to a torque transmitting device actuation system wherein each torque transmitting device is actuatable by a dedicated piezoelectric pump.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a pump that provides a pressurized fluid, such as oil, to a plurality of valves and solenoids within a valve body. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios. In the case of hybrid powertrains using a combination of the internal combustion (IC) engine and electric propulsion, these transmissions have a separate auxiliary electric pump for providing the pressurized hydraulic fluid when the IC engine is turned off. While conventional hydraulic control systems are effective, there is room in the art for improved hydraulic control circuits that reduce the amount of complex components while improving efficiency and controllability of the system.

SUMMARY

The present invention provides a hydraulic control system for actuating a torque transmitting device in a transmission. The hydraulic control system includes a sump for receiving a hydraulic fluid and a piezoelectric pump for pumping the hydraulic fluid from the sump to the torque transmitting device. A first fluid flow path communicates the hydraulic fluid from the sump to the piezoelectric pump and a second fluid flow path communicates the hydraulic fluid from the piezoelectric pump to the torque transmitting device. An exhaust means selectively communicates the hydraulic fluid from the torque transmitting device to the sump.

In one aspect of the present invention, the piezoelectric pump includes an inlet port that allows the hydraulic fluid to enter the piezoelectric pump and an outlet port that allows the hydraulic fluid to exit the piezoelectric pump.

In another embodiment of the hydraulic control system of the present invention, the hydraulic control system includes a sump for receiving a hydraulic fluid and a piezoelectric pump for pumping the hydraulic fluid from the sump to the torque transmitting device. A first fluid flow path communicates the hydraulic fluid from the sump to the piezoelectric pump. A second fluid flow path communicates the hydraulic fluid from the piezoelectric pump to the torque transmitting device. A third fluid flow path communicates the hydraulic fluid from the torque transmitting device to the sump. An exhaust device within the third fluid flow path selectively prevents the hydraulic fluid from communicating from the torque transmitting device to the sump.

In yet another aspect of the present invention, the third fluid flow path communicates with the second fluid flow path and a port in the sump.

In yet another aspect of the present invention, the system includes a first active one-way valve located in the first fluid flow path and a second active one-way valve located in the second fluid flow path to selectively change the direction of pumping, either from the sump to the torque transmitting device or vice-versa.

In yet another aspect of the present invention, the first and second active one-way valves are coupled to a housing of the piezoelectric pump.

In yet another aspect of the present invention, the system includes a four-way directional valve in communication with the first fluid flow path and the second fluid flow path and the four-way directional valve is operable to connect the first fluid flow path from the sump to the inlet port and operable to connect the second fluid flow path from the outlet port to the torque transmitting device when the four-way directional valve is in a first configuration and operable to connect the first fluid flow path from the sump to the outlet valve and to connect the second fluid flow path from the torque transmitting device to the inlet port when the four-way directional valve is in a second configuration.

In yet another aspect of the present invention, the torque transmitting device is drained of hydraulic fluid when the piezoelectric pump is activated and the four-way directional valve is in the second configuration.

In another aspect of the present invention, the exhaust device comprises an on/off solenoid operable to allow the hydraulic fluid to drain from the torque transmitting device through the third fluid flow path to the sump when the on/off solenoid is open.

In yet another aspect of the present invention, the third fluid flow path includes an orifice located downstream of the on/off solenoid, the orifice having a reduced cross-sectional area in order to control the flow of the hydraulic fluid from the torque transmitting device when the on/off solenoid is open.

In yet another aspect of the present invention, the exhaust device is a high-flow variable force solenoid that is operable to allow the hydraulic fluid to drain from the torque transmitting device to the sump when the high-flow variable force solenoid is open.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
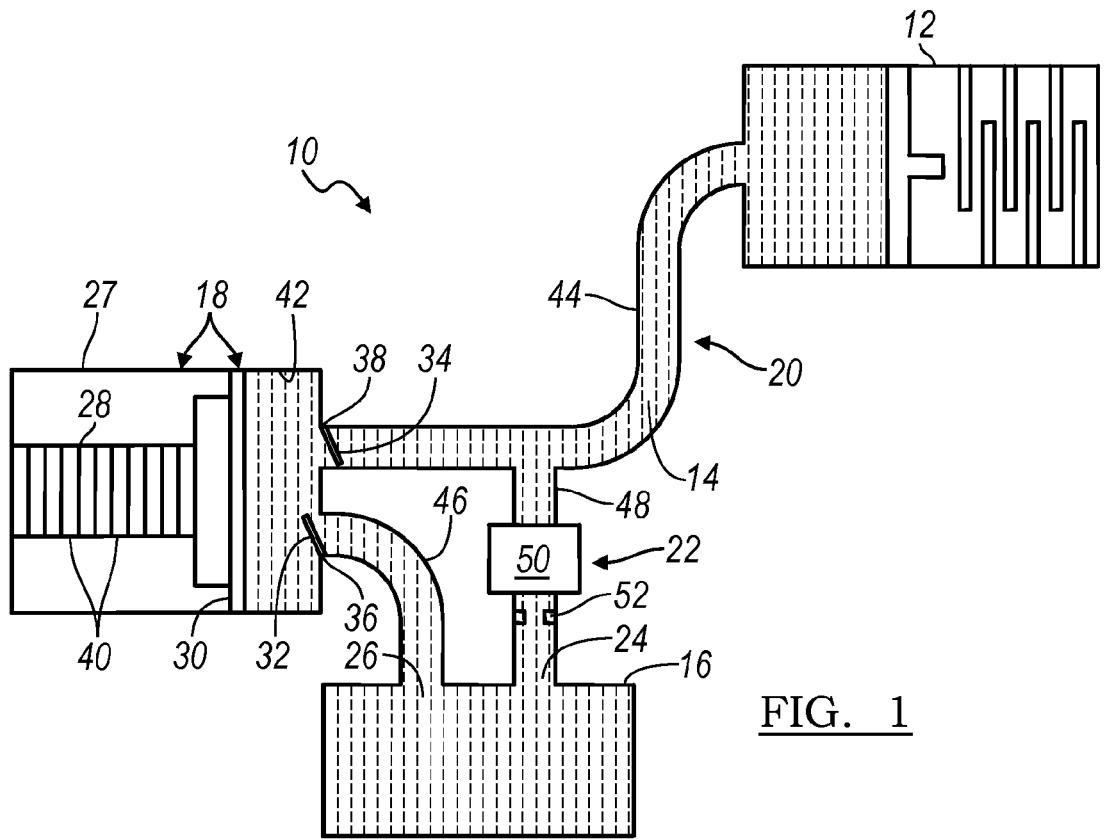
FIG. 1 is a schematic diagram of an embodiment of a hydraulic control system according to the principles of the present invention.

With reference to FIG. 1, a hydraulic control system according to the principles of the present invention is generally indicated by reference number 10. The hydraulic control system 10 is preferably employed in an automatic transmission having a plurality of torque transmitting devices 12, only one of which is shown. The torque transmitting devices 12 are hydraulically actuated by a hydraulic fluid 14 and may include friction clutches and/or brakes, though other types of hydraulically actuated torque transmitting devices may be employed without departing from the scope of the present invention. The hydraulic fluid 14 is, for example, an oil conventionally used in automatic transmission systems. The hydraulic control system 10 includes a sump 16, a piezoelectric pump 18, a hydraulic circuit 20, and an exhaust means or system 22. Preferably, the hydraulic control system 10 includes a piezoelectric pump 18 for each of the torque transmitting devices 12 within the transmission.

The sump 16 is a reservoir or tank for receiving and storing the hydraulic fluid 14. The sump 16 includes a sump inlet port 24 and a sump outlet port 26.

The piezoelectric pump 18 in the example provided generally includes a pump housing 27, an actuator stack 28, a diaphragm 30, an inlet valve 32, and an outlet valve 34. It should be appreciated, however, that the piezoelectric pump 18 may have various other configurations without departing from the scope of the present invention. The piezoelectric pump 18 is operable to pump the hydraulic fluid 14 through an inlet port 36 located in the housing 27 to an outlet port 38 located in the housing 27, as will be described in greater detail below. The actuator stack 28 is at least in partial contact with the diaphragm 30. The actuator stack 28 is comprised of a plurality of stacked piezoelectric material layers 40. The piezoelectric material layers 40 are comprised of a piezoelectric material that is operable to expand and contract (i.e., produce a strain output or deformation) when a suitable electric voltage is applied to the actuator stack 28. Examples of piezoelectric materials include, but are not limited to, quartz crystals, lead niobate barium titanate, and other titanate compounds such as lead zirconate titanate. However, it should be appreciated that the actuator stack 28 may take various forms without departing from the scope of the present invention, for example, the actuator stack 28 may include a single layer of piezoelectric material or other configurations other than or in addition to stacked layers of piezoelectric materials. The diaphragm 30 is preferably fixed relative to the actuator stack 28 and is comprised of a flexible but resilient material. The diaphragm 30 is operable to be deformed or flexed by the movement of the actuator stack 28, as will be described in greater detail below. Alternatively, the diaphragm 30 may be replaced by a conventional sliding piston or a combination piston/diaphragm combination without departing from the scope of the present invention.

The piezoelectric pump 18 also includes a fluid chamber 42 defined by housing 27 and by the diaphragm 30. The fluid chamber 42 is in communication with the inlet port 36 via the inlet valve 32 and is in communication with the outlet port 38 via the outlet valve 34. The inlet valve 32 is operable to allow flow of the hydraulic fluid 14 from the inlet port 36 into the fluid chamber 42 and operable to prevent the flow of the hydraulic fluid 14 from the fluid chamber 42 through the inlet port 36. Accordingly, the inlet valve 32 is a one-way flow valve. In the example provided, the inlet valve 32 is illustrated schematically as a one-way leaf valve, however, it should be appreciated that the inlet valve 32 may take various forms including, but not limited to, a check valve, reed valve, or a solenoid activated valve.

The outlet valve 34 is operable to allow flow of the hydraulic fluid 14 from the fluid chamber 42 into the outlet port 38 and operable to prevent the flow of the hydraulic fluid 14 from the outlet port 38 into the fluid chamber 42. Accordingly, the outlet valve 34 is a one-way flow valve. In the example provided, the outlet valve 34 is illustrated schematically as a one-way leaf valve, however, it should be appreciated that the outlet valve 34 may take various forms including, but not limited to, a check valve, reed valve, or a solenoid activated valve.

The hydraulic circuit 20 includes a first fluid flow path 44 and a second fluid flow path 46. The first fluid flow path 44 communicates the hydraulic fluid 14 between the pump outlet port 38 of the piezoelectric pump 18 and the torque transmitting mechanism 12. The second fluid flow path 46 communicates the hydraulic fluid 14 between the sump outlet port 26 and the pump inlet port 36. The first and second fluid flow paths 44, 46 are comprised of at least one fluid passageway, channel, or similar structure having any cross-sectional shape and size that is operable to communicate a fluid. However, it should be appreciated that the first and second fluid flow paths 44, 46 may be comprised of a plurality of linked passageways or channels without departing from the scope of the present invention.

The exhaust system 22 is operable to exhaust the hydraulic fluid 14 from the torque transmitting device 12 and return the hydraulic fluid 14 to the sump 16. The exhaust system 22 includes a third fluid flow path 48 and an on/off solenoid 50. The third fluid flow path 48 communicates the hydraulic fluid 14 between the first fluid flow path 44 and the sump inlet port 24. The third fluid flow paths 48 is comprised of at least one fluid passageway, channel, or similar structure having any cross-sectional shape and size that is operable to communicate a fluid. However, it should be appreciated that the third fluid flow paths 48 may be comprised of a plurality of linked passageways or channels without departing from the scope of the present invention. The on/off solenoid 50 is located within the third fluid flow path 48 and is operable to selectively prevent the hydraulic fluid 14 from communicating from the first fluid flow path 44 to the sump 16 when the on/off solenoid 50 is closed. When the on/off solenoid 50 is in the open position, the hydraulic fluid 14 is allowed to pass through the on/off solenoid 50 unobstructed until it reaches a fixed orifice 52 located downstream of the on/off solenoid 50 along the third fluid flow path 48. The fixed orifice 52 controls the flow of the hydraulic fluid 14 into the sump 16.

In order to actuate the torque transmitting device 12, the piezoelectric pump 18 is activated by applying a suitable electric voltage to the actuator stack 28 and the on/off solenoid 50 is closed. The actuator stack 28 deforms or expands in response to the electric voltage, contacts the diaphragm 30 and flexes the diaphragm 30 into the fluid chamber 42. The movement of the diaphragm 30 into the fluid chamber 42 alternately increases and decreases the volume of the fluid chamber 42, thereby creating a suction force and a pumping force. Hydraulic fluid 14 within the sump 16 is drawn by the suction force of the piezoelectric pump 18 through the second fluid flow path 46, through the inlet valve 36, through the pump 18, and out the outlet lave 34 into the first fluid flow path 44. The hydraulic fluid 14 is pumped to the torque transmitting device 12 and is prevented from travelling through the third fluid flow path 48 to the sump 16 by the closed on/off solenoid 50. The pressurized hydraulic fluid 14 delivered to the torque transmitting device 12 actuates the torque transmitting device 12.

In order to deactivate the torque transmitting device 12, the piezoelectric pump 18 is deactivated and the on/off solenoid 50 is opened. The hydraulic fluid 14 within the torque transmitting device 12, first fluid flow path 44, and the third fluid flow path 48 is drained into the sump 16.

Figure 2:
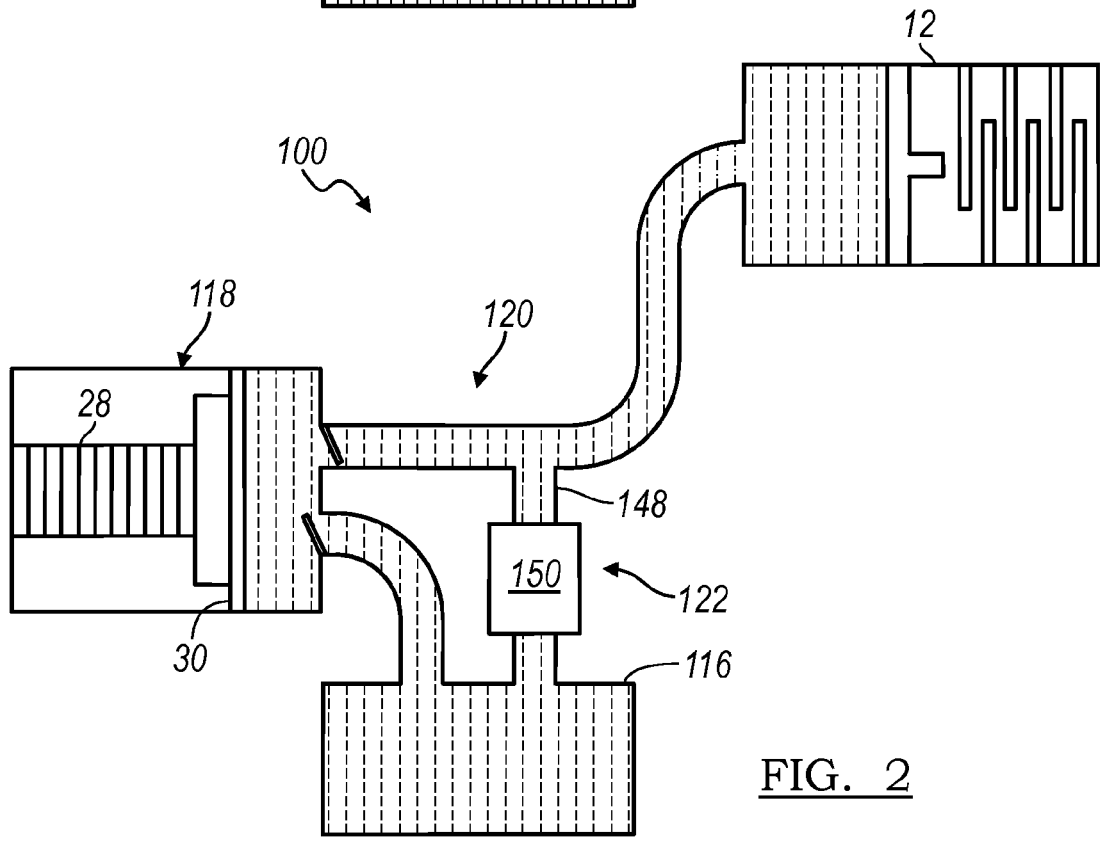
FIG. 2 is a schematic diagram of another embodiment of a hydraulic control system according to the principles of the present invention.

With reference to FIG. 2, another embodiment of the hydraulic control system according to the principles of the present invention is generally indicated by reference number 100. The hydraulic control system 100 includes a sump 116, piezoelectric pump 118, and hydraulic circuit 120 substantially similar to the sump 16, piezoelectric pump 18, and hydraulic circuit 20 shown in FIG. 1. However, the hydraulic control system 100 includes an exhaust system 122 that replaces the on/off solenoid 50 and fixed orifice 52 shown in FIG. 1 with a variable force solenoid 150. The variable force solenoid 150 allows for semi-active exhaustion of the hydraulic fluid 14 from the torque transmitting device 12 through a third fluid flow path 148. In an alternate embodiment, the variable force solenoid 150 may be replaced with a controlled variable orifice.

Figure 3:
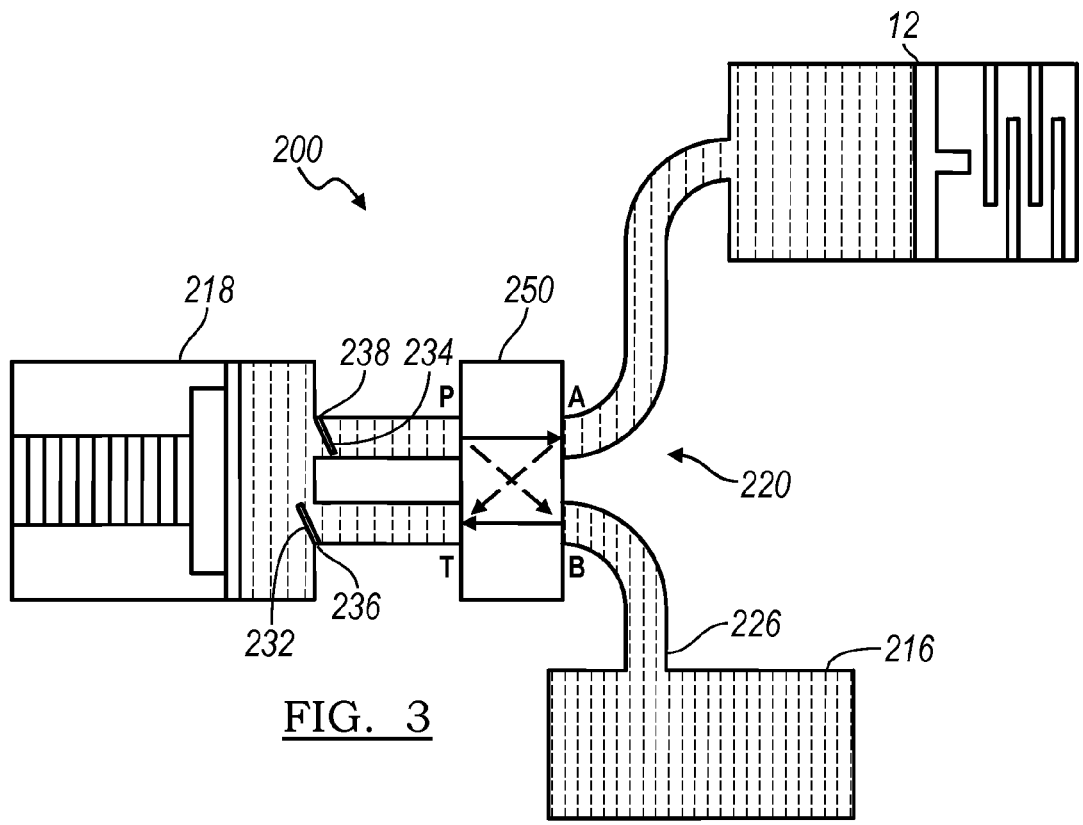
FIG. 3 is a schematic diagram of yet another embodiment of a hydraulic control system according to the principles of the present invention.

Turning now to FIG. 3, another embodiment of the hydraulic control system according to the principles of the present invention is generally indicated by reference number 200. The hydraulic control system 200 includes a sump 216 having a single sump port 226 and piezoelectric pump 218 substantially similar to the piezoelectric pump 18 shown in FIG. 1 and including a pump inlet port 236, a pump outlet port 238, and one way valves 232 and 234. However, the hydraulic control system 200 includes an apply/exhaust system 220 that replaces the on/off solenoid 50 and fixed orifice 52 shown in FIG. 1 with a four-way directional valve 250. The four-way directional valve 250 includes an inlet port "P", an outlet port "T", and two actuator ports "A" and "B". The inlet port "P" is in communication with the pump outlet port 238 and the outlet port "T" is in communication with the pump inlet port 236. Actuator port "A" is in communication with the torque transmitting device 12 and actuator port "B" is in communication with the sump port 226. The four-way directional valve 250 is operable to connect the ports "P", "T", "A", and "B" in at least two configurations. In a first configuration, inlet port "P" is in communication with actuator port "A" and outlet port "T" is in communication with actuator port "B". In a second configuration, inlet port "P" is in communication with actuator port "B" and outlet port "T" is in communication with actuator port "A".

In order to actuate the torque transmitting device 12, the piezoelectric pump 218 is activated by applying a suitable electric voltage to the actuator stack 28 and the four-way directional valve 250 is in the first configuration. The actuator stack 28 deforms or expands in response to the electric voltage, contacts the diaphragm 30 and flexes the diaphragm 30 into the fluid chamber 42. The movement of the diaphragm 30 into the fluid chamber 42 alternately increases and decreases the volume of the fluid chamber 42, thereby creating a suction force and a pumping force. Hydraulic fluid 14 within the sump 216 is drawn by the suction force of the piezoelectric pump 18 through the sump port 226, in through actuator port "B", through the outlet port "T", through the inlet valve 236, through the pump 218, out the pump outlet valve 234, though the inlet port "P", through actuator port "A", and to the torque transmitting device 12. The pressurized hydraulic fluid 14 delivered to the torque transmitting device 12 actuates the torque transmitting device 12.

In order to deactivate the torque transmitting device 12, the piezoelectric pump 18 remains activated and the four-way directional valve 250 is placed in the second configuration. The hydraulic fluid 14 within the torque transmitting device 12 communicates through actuator port "A" to the outlet port "T", from the outlet port "T" through the pump inlet port 236, out the pump outlet port 238 to the inlet port "P", from the inlet port "P" through the actuator port "B" to the sump 216.

Figure 4:
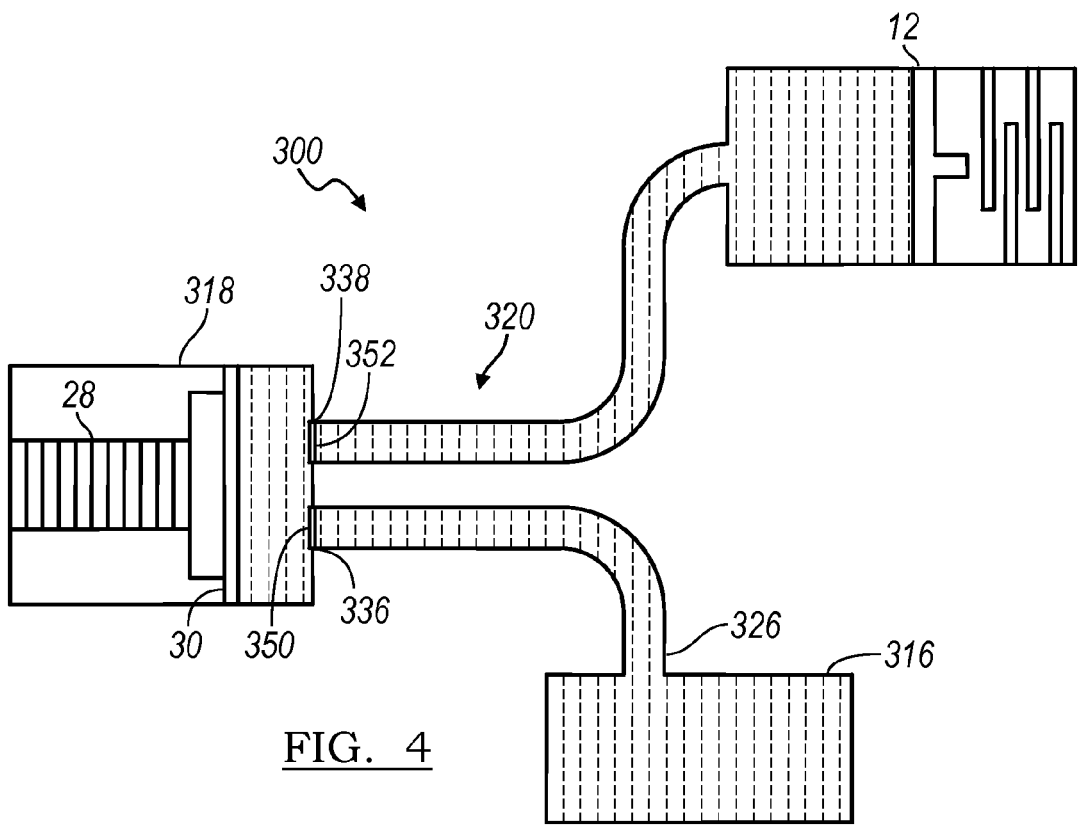
FIG. 4 is a schematic diagram of yet another embodiment of a hydraulic control system according to the principles of the present invention.

Turning to FIG. 4, another embodiment of the hydraulic control system according to the principles of the present invention is generally indicated by reference number 300. The hydraulic control system 300 includes a sump 316 having a single sump port 326, a piezoelectric pump 318 that is substantially similar to the piezoelectric pump 18 shown in FIG. 1 and including a pump inlet port 336 and a pump outlet port 338. However, the hydraulic control system 300 includes an exhaust system 320 that replaces the one way valves 36, 38 of the piezoelectric pump 18 and the on/off solenoid 50 and fixed orifice 52 shown in FIG. 1 with a first active one-way valve 350 and a second active one-way valve 352. The first and second active one-way valves 350, 352 are operable to allow one way flow of the hydraulic fluid 14 through the valves 350, 352 and to selectively reverse the flow of the hydraulic fluid through the valves 350, 352. In the embodiment provided, the valves 350, 352 are active one-way reed valves, though it should be appreciated that various other kinds of active one-way valves may be employed without departing from the scope of the present invention.

In order to actuate the torque transmitting device 12, the piezoelectric pump 318 is activated by applying a suitable electric voltage to the actuator stack 28, the first one-way directional valve 350 allows fluid communication from the sump 316 to the piezoelectric pump 318, and the second one-way directional valve 352 allows fluid communication from the piezoelectric pump 318 to the torque transmitting device 12. The actuator stack 28 deforms or expands in response to the electric voltage, contacts the diaphragm 30 and flexes the diaphragm 30 into the fluid chamber 42. The movement of the diaphragm 30 into the fluid chamber 42 alternately increases and decreases the volume of the fluid chamber 42, thereby creating a suction force and a pumping force. Hydraulic fluid 14 within the sump 316 is drawn by the suction force of the piezoelectric pump 318 through the sump port 326, through the first one-way directional valve 350, through the pump 318, out the second one-way directional valve 352 to the torque transmitting device 12.

In order to deactivate the torque transmitting device 12, the piezoelectric pump 18 remains activated and the valves 350, 352 are configured to allow fluid flow in the reverse directions. Accordingly, the first one-way directional valve 350 allows fluid flow from the pump 318 to the sump 316, and the second one-way directional valve allows fluid flow from the torque transmitting device 12 to the pump 318. The hydraulic fluid 14 within the torque transmitting device 12 communicates through the second one-way directional valve 352, through the pump 318, out through the first one-way directional valve 350 and on to the sump 316. The draining of the torque transmitting device 12 is considered active as the piezoelectric pump 418 actively pumps the hydraulic fluid 14 from the torque transmitting device 12.

Figure 5:
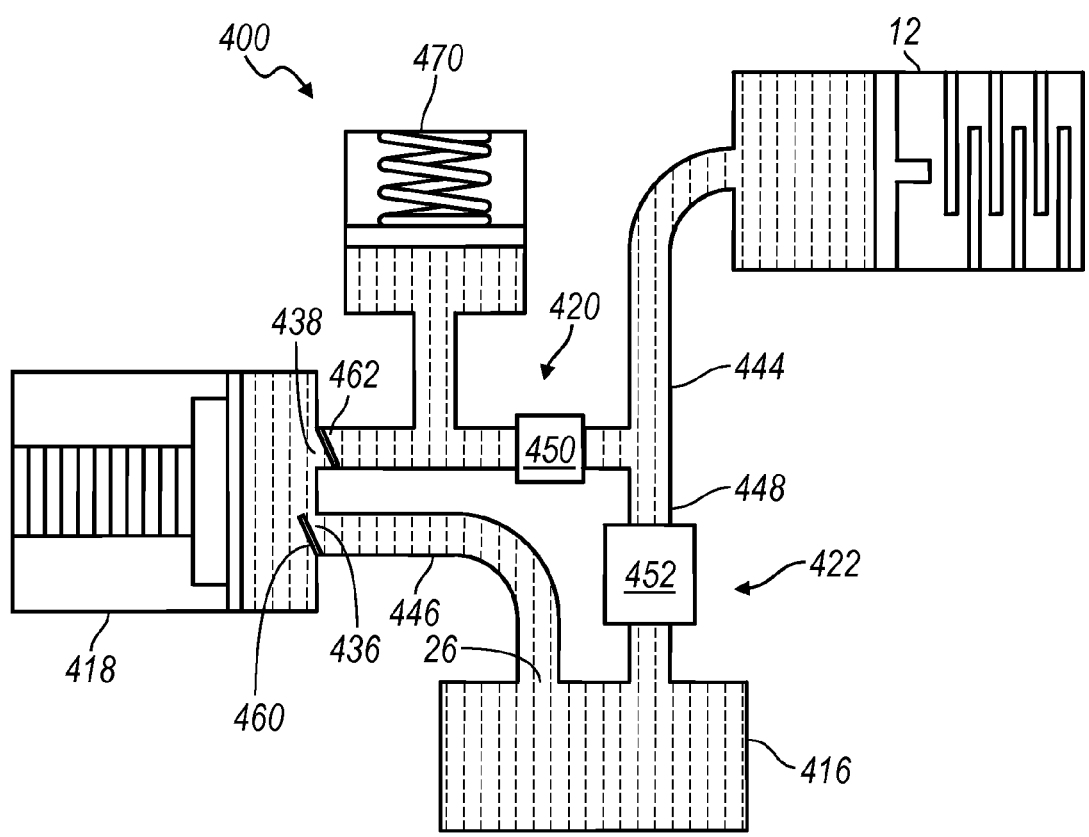
FIG. 5 is a schematic diagram of yet another embodiment of a hydraulic control system according to the principles of the present invention.

With reference to FIG. 5, another embodiment of the hydraulic control system according to the principles of the present invention is generally indicated by reference number 400. The hydraulic control system 400 includes a sump 416 and a piezoelectric pump 418 substantially similar to the sump 16 and piezoelectric pump 18 shown in FIG. 1. However, the hydraulic control system 400 includes a hydraulic circuit 420 and an exhaust system 422. The hydraulic circuit 420 includes a first fluid flow path 444, a second fluid flow path 446, and an on/off solenoid 450. The first fluid flow path 444 communicates the hydraulic fluid 14 between a pump outlet port 438 of the piezoelectric pump 418 and the torque transmitting mechanism 12. The second fluid flow path 446 communicates the hydraulic fluid 14 between the sump outlet port 26 and a pump inlet port 436. The first and second fluid flow paths 444, 446 are comprised of at least one fluid passageway, channel, or similar structure having any cross-sectional shape and size that is operable to communicate a fluid. However, it should be appreciated that the first and second fluid flow paths 444, 446 may be comprised of a plurality of linked passageways or channels without departing from the scope of the present invention. The on/off solenoid 450 is located within the first fluid flow path 444 between the piezoelectric pump 418 and the torque transmitting device 12.

The exhaust system 422 is operable to exhaust the hydraulic fluid 14 from the torque transmitting device 12 and return the hydraulic fluid 14 to the sump 416. The exhaust system 422 includes a third fluid flow path 448 and a variable force solenoid 452. The third fluid flow path 448 communicates the hydraulic fluid 14 between the first fluid flow path 444 and the sump 416. More specifically, the third fluid flow path 448 communicates with the first fluid flow path 44 between the on/off solenoid 450 and the torque transmitting device 12. The third fluid flow path 448 is comprised of at least one fluid passageway, channel, or similar structure having any cross-sectional shape and size that is operable to communicate a fluid. However, it should be appreciated that the third fluid flow path 448 may be comprised of a plurality of linked passageways or channels without departing from the scope of the present invention. The variable force solenoid is located within the third fluid flow path 448 and is operable to selectively prevent the hydraulic fluid 14 from communicating from the first fluid flow path 444 to the sump 416 when the variable force solenoid 452 is closed. Accordingly, the variable force solenoid 452 allows for semi-active exhaustion of the hydraulic fluid 14 from the torque transmitting device 12 through the third fluid flow path 448. In an alternate embodiment, the variable force solenoid 452 may be replaced with a controlled variable orifice.

The hydraulic control system 400 also includes an accumulator 470 in communication with the first fluid flow path 444 between the piezoelectric pump 418 and the on/off solenoid 450. The accumulator 470 is employed to increase the flow of the hydraulic fluid 14 from the piezoelectric pump 414 to the torque transmitting device 12.

In order to actuate the torque transmitting device 12, the piezoelectric pump 418 is activated by applying a suitable electric voltage, as described above. Additionally, the on/off solenoid 450 is opened and the variable force solenoid 452 is closed. Hydraulic fluid 14 within the sump 416 is drawn by the suction force of the piezoelectric pump 418 through a first one-way directional valve 460, through the pump 418, out a second one-way directional valve 462 through the open on/off solenoid 450 to the torque transmitting device 12. In order to provide additional fluid flow, the on/off solenoid 450 is closed. Accordingly, the piezoelectric pump 418 fills or charges the accumulator 470 with the hydraulic fluid 14. When the additional flow rate of hydraulic fluid 14 is required, the on/off solenoid 450 is opened and the accumulator 470 is activated and quickly delivers a high flow rate of hydraulic fluid 14 to the torque transmitting device 12. The accumulator 470 may be used to provide a higher flow rate to fill the torque transmitting device 12 more quickly or alternately the accumulator 470 could be released over an extended period of time under certain conditions, such as when it is desirable to hold the torque transmitting device 12 capacity during an engine start-stop maneuver in a mild hybrid application.

In order to deactivate the torque transmitting device 12, the piezoelectric pump 418 is deactivated, the on/off solenoid 450 is closed, and the variable force solenoid 452 is opened. The hydraulic fluid 14 then drains out of the torque transmitting device 12 through the first fluid flow path 444, through the third fluid flow path 448 to the sump 416. The exhaust of the torque transmitting device 12 is semi-active in that the piezoelectric pump 418 is deactivated and gravity is used to drain the torque transmitting device 12.

The description of the invention is merely exemplary in nature and variations that do not depart from the gist of the invention are intended to be within the scope of the invention. Such variations are not to be regarded as a departure from the spirit and scope of the invention.

We claim the following:

1. A hydraulic control system for actuating a torque transmitting device in a transmission, the hydraulic control system comprising:
    a sump for receiving a hydraulic fluid;
    a piezoelectric pump for pumping the hydraulic fluid from the sump to the torque transmitting device; a first fluid flow path that communicates the hydraulic fluid from the sump to the piezoelectric pump;
    a second fluid flow path that communicates the hydraulic fluid directly from the piezoelectric pump directly to the torque transmitting device;
    a third fluid flow path that communicates the hydraulic fluid directly from the second fluid flow path to the sump;
    an exhaust device within the third fluid flow path for selectively preventing the hydraulic fluid from communicating from the second fluid flow path to the sump; and
    an orifice located downstream of the exhaust device in the third fluid flow path, the orifice having a reduced cross-sectional area in order to control the flow of the hydraulic fluid from the torque transmitting device when the exhaust device is open.

2. The hydraulic control system of claim 1 wherein the exhaust device comprises an on/off solenoid operable to allow the hydraulic fluid to drain from the torque transmitting device through the third fluid flow path to the sump when the on/off solenoid is open.

3. The hydraulic control system of claim 1 wherein the exhaust device is a variable force solenoid that is operable to allow the hydraulic fluid to drain from the torque transmitting device to the sump when the variable force solenoid is open.

4. A hydraulic control system for actuating a torque transmitting device in a transmission, the hydraulic control system comprising:
    a sump for receiving a hydraulic fluid;
    a piezoelectric pump for pumping the hydraulic fluid from the sump to the torque transmitting device in a first mode of operation and for pumping the hydraulic fluid from the torque transmitting device to the sump in a second mode of operation, the piezoelectric pump having a first active one-way valve and a second active one-way valve, the first one-way valve operable to selectively prevent flow of the hydraulic fluid from the piezoelectric pump to the sump in the first mode of operation and to selectively prevent flow of the hydraulic fluid from the sump to the piezoelectric pump in the second mode of operation, the second active one-way valve operable to selectively prevent flow of the hydraulic fluid from the piezoelectric pump to the torque transmitting device in the second mode of operation and to selectively prevent flow of the hydraulic fluid from the torque transmitting device to the piezoelectric pump in the first mode of operation;

a first fluid flow path that communicates the hydraulic fluid between the sump and the piezoelectric pump without interruption; and a second fluid flow path that communicates the hydraulic fluid between the piezoelectric pump and the torque transmitting device without interruption.

5. The hydraulic control system of claim 4 wherein the first and second active one-way valves are coupled to a housing of the piezoelectric pump.

6. A hydraulic control system for actuating a torque transmitting device in a transmission, the hydraulic control system comprising:

a sump for receiving a hydraulic fluid;

a piezoelectric pump for pumping the hydraulic fluid from the sump to the torque transmitting device, wherein the piezoelectric pump includes an inlet port that allows the hydraulic fluid to enter the piezoelectric pump and an outlet port that allows the hydraulic fluid to exit the piezoelectric pump;

a first fluid flow path that communicates the hydraulic fluid from the sump to the piezoelectric pump;

a second fluid flow path that communicates the hydraulic fluid from the piezoelectric pump to the torque transmitting device; and a four-way directional valve in communication with the first fluid flow path and the second fluid flow path, wherein the four-way directional valve is operable to connect the first fluid flow path from the sump to the inlet port and operable to connect the second fluid flow path from the outlet port to the torque transmitting device when the four-way directional valve is in a first configuration and operable to connect the first fluid flow path from the sump to the outlet valve and to connect the second fluid flow path from the torque transmitting device to the inlet port when the four-way directional valve is in a second configuration.

7. The hydraulic control system of claim 6 wherein the torque transmitting device is drained of hydraulic fluid when the piezoelectric pump is activated and the four-way directional valve is in the second configuration.

* * * * *